United States Patent [19]

McNutt et al.

[11] Patent Number: 4,805,207
[45] Date of Patent: Feb. 14, 1989

[54] MESSAGE TAKING AND RETRIEVAL SYSTEM

[75] Inventors: Anne E. M. McNutt, Methuen, Mass.; Robert M. Schenkein, Derry, N.H.

[73] Assignee: Wang Laboratories, Inc., Lowell, Mass.

[21] Appl. No.: 773,759

[22] Filed: Sep. 9, 1985

[51] Int. Cl.$^4$ ............................................. H04M 3/50
[52] U.S. Cl. ...................................... 379/89; 379/214; 381/52
[58] Field of Search ...................... 381/51, 52; 379/88, 379/89, 67, 201, 96, 97, 213, 214

[56] References Cited

U.S. PATENT DOCUMENTS

| | | | |
|---|---|---|---|
| 4,375,582 | 3/1983 | Gist et al. | 379/214 |
| 4,598,367 | 7/1986 | DeFrancesco | 364/408 |
| 4,600,809 | 7/1986 | Tatsumi et al. | 379/88 |
| 4,602,129 | 7/1986 | Matthews et al. | 379/88 |
| 4,634,809 | 1/1987 | Paulsson et al. | 379/91 |
| 4,659,877 | 4/1987 | Dorsey et al. | 379/88 |

FOREIGN PATENT DOCUMENTS

| | | | |
|---|---|---|---|
| 3342606 | 6/1985 | Fed. Rep. of Germany | 381/51 |
| 0020061 | 2/1982 | Japan | 379/88 |
| 0127221 | 8/1982 | Japan | 379/88 |

OTHER PUBLICATIONS

"SESAM" is opening new doors in the world of PABX's, K. Paulsson, TELE (Sweden), vol. 34, No. 1, 1982, pp. 17-28.

"Structure of the SESAM Service within a Company", K. Paulsson, TELE (Sweden), vol. 34, No. 1, 1982, pp. 29-31.

*TELESENSORY Speech Systems*, product description, 1983.

"Application of Speech Recognition and Synthesis to PABX Services", Mulla and Vaughan, *Electrical Communication*, vol. 59, No. 3, May 1985, pp. 273-280.

*Primary Examiner*—Thomas W. Brown
*Attorney, Agent, or Firm*—Michael H. Shanahan; Gordon E. Nelson

[57] ABSTRACT

A system for taking and retrieving telephone messages. The system is used with a PBX and includes a central computer, operator stations for taking telephone messages, and retrieval stations permitting retrieval of messages either locally or via a telephone call. The central computer includes a disk drive and is connected via a RS 232 link to the PBX. Information about parties having telephones connected to the PBX and messages in the ASCII codes for those parties are stored on the disk drive. Each operator station includes a personal computer which is connected by an adapter to a telephone line from the PBS and by a data link to the central computer. The personal computer has a keyboard and display. When a call is forwarded to an operator station, the central computer provides information about the caller to the PC, which displays it on the station display. Messages for the caller are entered using the PC keyboard and forwarded by the PC to the central computer. Each retrieval station contains a personal computer with keyboard and display which is connected by an adapter to a telephone line from the PBX and by a data link to the central computer. When a message is stored in the central computer for a callee, that fact is indicated on the display. A message may be retrieved either by means of the keyboard or by means of a telephone call to the retrieval station. In both cases, the retrieval station retrieves the message from the disk and in the latter case, the retrieval station provides the message over the phone line by converting the stored message to voice signals.

15 Claims, 8 Drawing Sheets

MESSAGE TAKING AND RETRIEVAL SYSTEM

FIELD OF THE INVENTION

This invention is related to computer driven systems for taking and retrieving telephone messages.

BACKGROUND OF THE INVENTION

The need to take messages and distribute them to the intended recipient is an important part of business activities which has been addressed in many different ways. Answering services, receptionists, and automatic telephone answering machines are well known examples of methods used to take and retrieve such messages.

Telephone answering systems have two major functions: to take and store a message until it is ultimately delivered, and retrieving messages upon the request of a user. Several features are important to any telephone message system. Obviously, the most important aspect is that the message reach the intended recipient. The ability to transfer callers to other people who might be able to help them is another important and advantageous feature. For example, a caller's question might well be answered by a secretary or assistant to the person being called.

Recently, the availability of powerful computers which are within the range of small and medium sized businesses has provided an incentive to create systems in which the computer performs many of the tasks involved in telephone message taking. Typically, such systems have a human operator who answers calls directed to the operator's station when a called party is unable to answer. The ability of a computer to store and quickly retrieve selected items from a large amount of data enables computer based systems to easily present to an operator data associated with the called party which can aid the operator in responding to the caller's inquiries.

SUMMARY OF THE INVENTION

Briefly, the present invention includes a system which allows one or more operators to receive calls to a called party who is not able to answer his or her phone. Information specific to the called party is presented to the operator in response to conventional data from a PBX indicating the called party, and optionally the calling party in some cases. The operator may take a message for the called party by typing the message on a terminal, and this message is stored in a central computer, typically on a hard disk, in the form of ASCII-coded characters.

Messages stored on the central computer may be retrieved through the use of one or more retrieval stations, which may be implemented by a personal computer or similar device. The retrieval station includes a data link to the central computer over which messages and related data are transmitted, and a link to a telephone line allowing the retrieval station to answer and respond to incoming calls.

The computer retrieval station additionally includes hardware for performing a conversion from conventional text into the English (or other language) phonetic equivalent and for applying these "sounds" to the phone lines. The retrieval station also includes means for detecting and responding to dual-tone multi-frequency signals generated by pressing the buttons of a conventional push button phone.

A person may retrieve messages in either of two different ways. When a person is physically at the location of the retrieval station, a person may type in identification information after which the person may scan or review messages in a conventional manner. Alternatively, a person may also call in from any telephone having touch tone capability and have messages "read" back by the computer. When a person calls in, the retrieval station sends English language prompts over the telephone lines requesting the caller to enter a password identifying the caller. If the password is valid, the retrieval station in conjunction with the central computer determines whether there are any messages for the caller and so informs the caller. If there are messages, the caller may review the entire message or selected portions of a message, may go backwards and forwards through a list of several messages, may delete selected messages, and may print selected messages at the retrieval station for delivery to the caller's desk or other predetermined location.

The present invention has numerous advantages over presently known systems for performing computer-controlled message retrieval.

Message systems are known in which a voice message for a person may be stored directly by a caller. One such system is the DVX system from Wang Laboratories, Lowell, Mass. These systems have several disadvantages when compared to the present invention, however.

Since the present invention stores messages as ASCII-coded data, or the equivalent, storage space is greatly reduced compared to systems which store audible messages as data representative of the actual sounds. For example one second of acceptable quality speech for a system which stores sound data directly takes on the order of one to two Kbytes of storage per second of message, while the equivalent ASCII-coded data would require on the order of 50 to 100 bytes of storage. This saving in storage requirements becomes very important in systems in which messages are stored for large numbers of people. Perhaps more importantly, the present invention stores data in a format which may be easily integrated with other computer-controlled office support systems.

It is important that a user of the system be provided with prompts which instruct the user how to use the system. With available systems, these prompts must be recorded by a person, typically a professional announcer or similar person. This is frequently costly, and entails the disadvantage that the same person must be used to later record new or modified prompts, if uniformity of the prompting voice is required. With the present invention, prompts are stored in ASCII form and may be easily modified or supplemented.

The present invention requires far fewer people to accommodate a given number of users than do presently known systems. The message retrieval function is carried out without the need for intervention by a person. Thus, operators are freed from the task of checking for and retrieving messages. Typcally, with known computer controlled message systems, an operator spends much time on calls which are checks for messages when there are no messages for that caller. The present invention eliminates the operator time wasted in doing such checks. Additionally, messages may be checked by a user at any time, and from any location where there is a phone, independent of whether an operator is currently on duty or available.

DESCRIPTION OF THE DRAWINGS

These and other advantages of the present invention will become more clear upon reading the following description of the preferred embodiment, in conjunction with the accompanying drawings, of which.

DESCRIPTION OF THE PREFERRED EMBODIMENT

Figure 1:
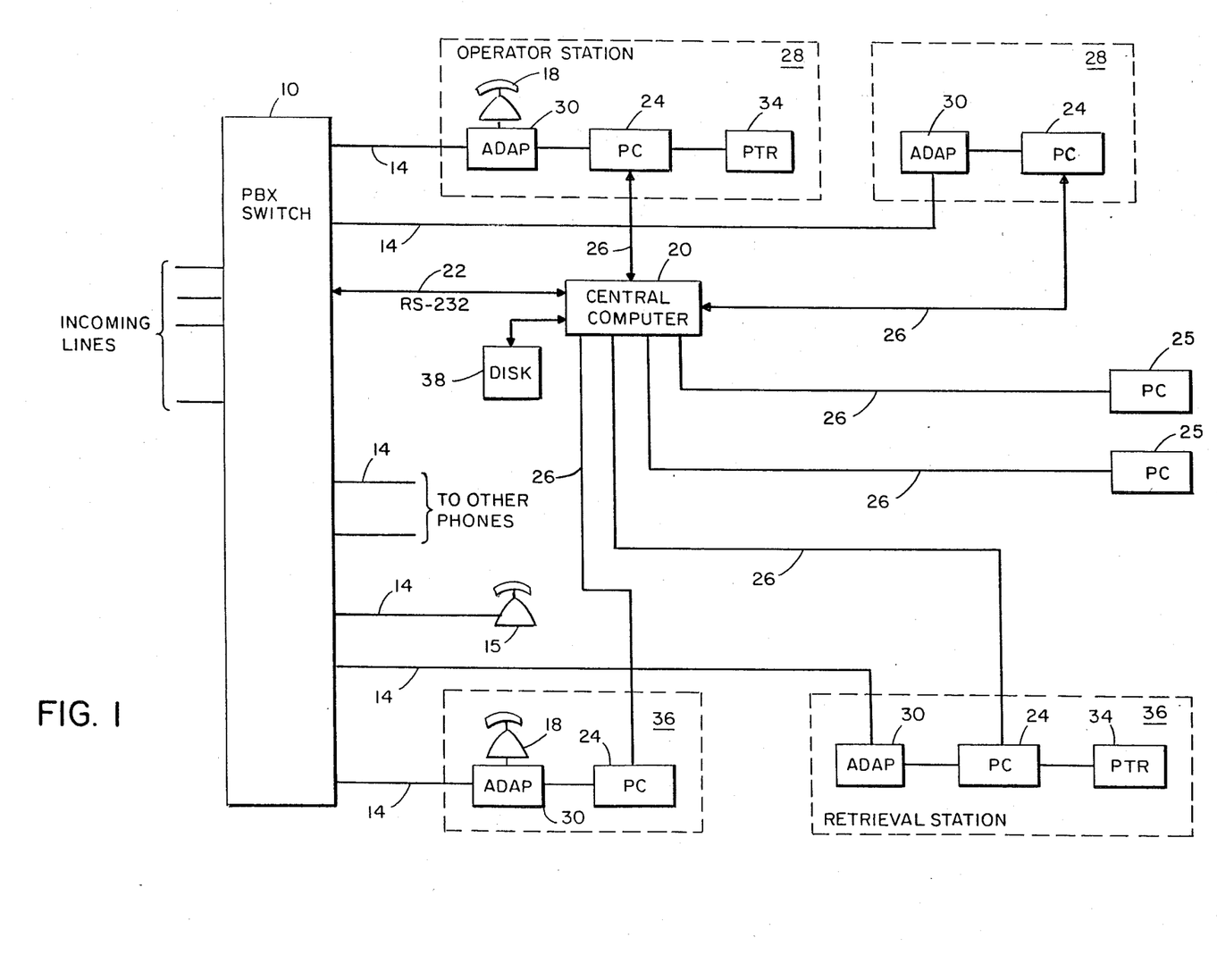
FIG. 1 is a block diagram of the present invention and its interconnection to a telephone exchange switch.

Referring to FIG. 1, there is shown a block diagram of a representative implementation of the present invention. In FIG. 1, a private branch exchange 10 or other type of central office telephone switch controls the interconnection of a plurality of incoming telephone lines 12 with a second plurality of station lines 14 going to various devices which may include individual telephone sets, e.g., 15, computers connected to the lines by modems, or other devices. These lines carry voice or other sound-encoded data.

A central computer 20 is provided which is typically also used to provide other computing functions which might be used in an office. A VS15 computer manufactured by Wang Laboratories may be used to implement computer 20, although other machines may also be used. As will become clear from the following description, the present invention may be used to retrieve any message stored in an electronic "mailbox" of a user, and one of the advantages of the present invention is that it may be easily integrated with an office communication or "electronic mail" system to retrieve messages from other sources. Computer 20 has a hard disk unit 38 or other type of mass storage device capable of storing large amounts of data.

Computer 20 is connected to a plurality of other computers 24 via data lines 26. Computers 24 are typically smaller computers, such as so-called personal computers (PC's). Communication between the central computer 20 and each of the PC's 24 takes place over data lines 26. In the present invention, one or more PC's 24 are configured as operator stations 28, at which messages are taken, and one or more PC's are configured as message retrieval stations 36, where messages may be retrieved, either in person or over the telephone. The central computer 20 may optionally be connected to other computer workstations 25, especially where the central computer is also used to provide other computing functions in an office. The central computer is connected to each of the PC's 24 and 25 via a data line 26. In the preferred embodiment, this data link is a high speed, 4 Mbit/sec serial data line, although other types of data links could equally well be used. (As used herein, the term line is used to refer to as a set of one or more conductors which carry related signals between two points.)

Figure 2:
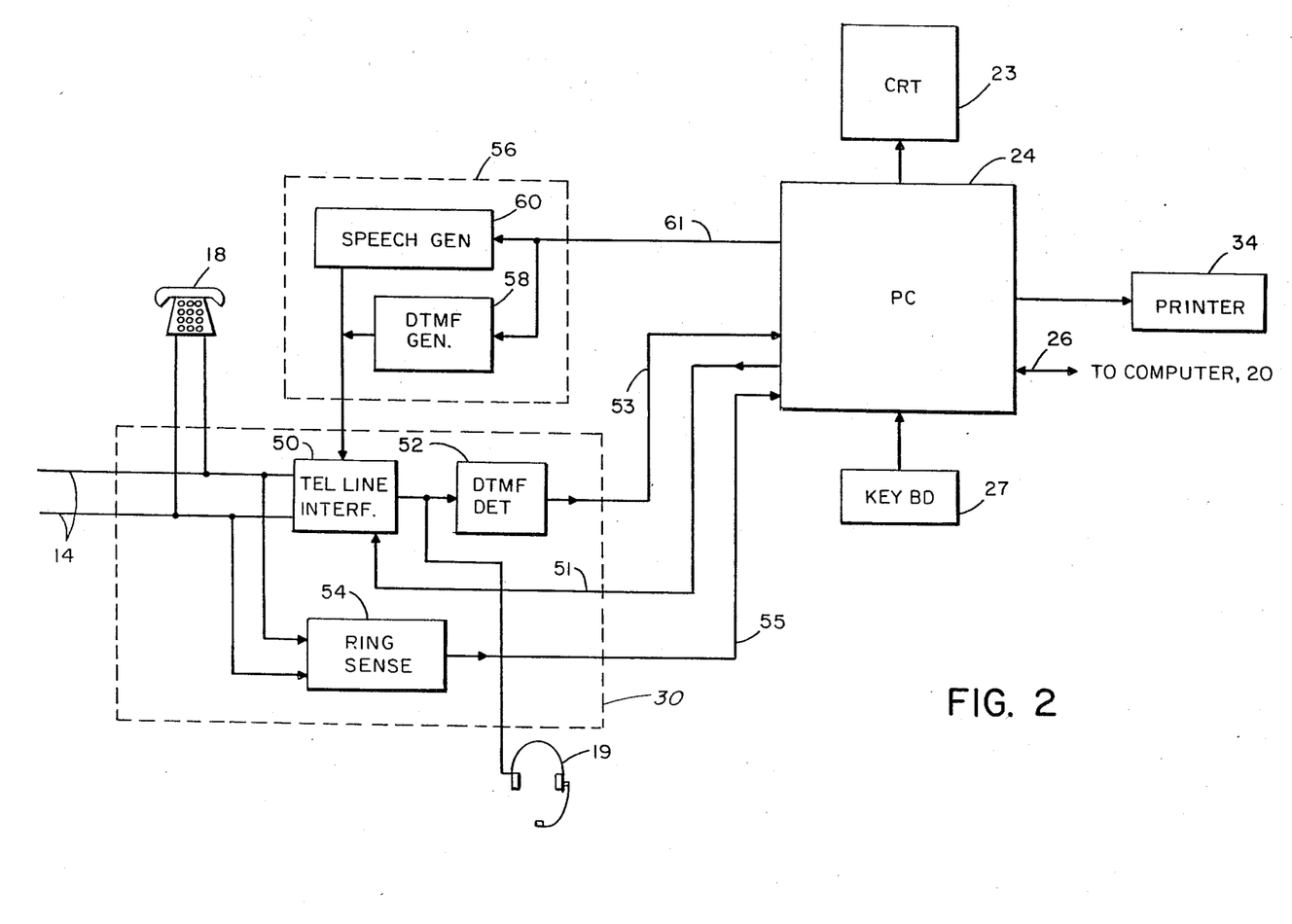
FIG. 2 is a block diagram showing further details of the operator and message retrieval stations.

The configuration of the operator and message retrieval stations 28 and 36 is shown in FIG. 1 and in more detail in FIG. 2. Each operator station includes a PC 24 which is a small computer, such as a Wang PC Professional Computer. The PC includes an associated display device, such as CRT 23, and a keyboard 27. The PC may be connected to a printer 34.

The telephone station lines 14 are connected to PC's 24 via a telephone adapter circuit 30. Adapter circuit 30 includes a telephone line interface circuit 50, which in the described embodiment is a CH1812 integrated circuit available from Cermetek, Inc. Interface circuit 50 provides the proper impedances and signal levels to the telephone lines in response to signals applied to the interface circuit, as described below. The interface circuit also enables PC 24 to control the on-hook or off-hook state of interface circuit via a signal on line 51 to interface circuit 50.

The signals on lines 14 are applied via interface circuit 50 to a dual-tone, multi-frequency (DTMF) detector circuit 52. In the described embodiment, detector circuit 52 is implemented with a 202 DTMF detector integrated circuit available from SSI, Inc. Detector circuit 52 applies signals to line 53 which are representative of the tones on the telephone lines 14. Line 53 goes to an input port of the PC 24. By reading the signals on line 53 from detector circuit 52, PC 24 is able to decode tone-encoded dial signals on line 14.

A ring sense relay is connected across the station lines 14, and provides an ouput indication on line 55 when a ring signal is being applied to the line. In the preferred embodiment, relay 54 is a Teletone M-949 ring sense relay. Line 55 goes to an input port to PC 24, and by reading the signal on line 55, the PC can detect the presence of a ring signal on the station lines 14.

A telephone set 18 may be connected across the telephone lines to provide a means for an operator to answer the phone if the PC or system is not working. A headset 19 is connected to the interface circuit and is used by operators at operator stations to answer telephone calls.

The PC is able to send signals over the telephone lines by means of a signal generator circuit 56. Two types of signals are applied to the telephone lines 14 by circuit 56.

Speech signals may be applied to the telephone lines 14 by a speech generator circuit 60. As discussed below, the present invention stores in text form messages and other information to be output as speech. In response to ASCII data which is to be verbalized over the telphone lines, a text-to-speech conversion is performed by the PC in conjunction with speech generator circuit 60. Methods for doing this are known in the art and typically include software which performs a conversion of text to speech parameters. These speech parameters are then applied to a specialized circuit which converts these speech parameters into electrical signals representative of speech.

In the described embodiment, the PC 24 carried out software routines to perform the text to speech parameter conversion and applies the speech parameters thus generated to speech generator 60 circuit over line 61. The algorithm used for this conversion is described in "Phonological Rules For Text To Speech Systems," by S. Hunnicutt in *Americal Journal of Computational Linguistics*, Microfiche 57, 1976. Further information may be found in "MIT-Talk-79; the MIT Text To Speech System" by J. Allen, *Speech Communications Papers Presented At the 97th Meeting of the Accoustics Society of America,* 1979; and "Software for Cascade/Parallel Formant Synthesizers," by D. H. Klatt in *Journal of the Accoustic Society of America,* Vol. 67, pp 13–33, 1980. The described embodiment uses a TMS 320 integrated circuit to generate the audio signals which are applied to lines 14. Other text to speech systems are available and may be used with the present invention without departing from the scope of the invention, such as the DecTalk system available from Digital Electronics Corporation.

Conventional DTMF signals may also be applied to the station lines by the PC 24 via a signal generator circuit 56. This allows tone dialing signals to be transmitted over the phone lines by PC 24. Signals from the PC over line 61 control a DTMF generator circuit 58. In the described embodiment, the same TMS 320 integrated circuit as is used for speech generation is used to generate the DTMF signals. Alternatively, the DTMF signals may be generated by a separate, special purpose circuit, such as a MK5089 DTMF generator integrated circuit available from the Mostek Corporation.

Returning to FIG. 1, the PC in each message retrieval station 36 is connected to the central computer 20 via data links 26 and to respective station lines 14 via a telephone interface unit 30. The retrieval stations may optionally include a printer 34 for providing hard copy of messages.

A data link 22 from switch 10 to computer 20 provides digital data relevant to a call coming from switch 10. This data is generated and sent out by the switch 10 and includes data representative of the source of and other information relevant to the call. In a typical computer controlled telephone answering system, such as Wang Office, available from Wang Laboratories, a number of operator stations 28 are connected to switch 10 and computer 20. Typically all of the operator stations 28 are connected in a call queue, which is provided by telephone switch 10. The call queue receives all calls which are directed to the operator and connects them to the first available operator station. When a call is to be sent to an operator, the switch 10 automatically determines the first available operator station and routes the call to that station. At the same time that a call is sent to an operator, switch 10 sends data over data link 22 to computer 20 indicating the operator station to which the call is being sent, the source of the call, and other information about the call as discussed below.

Calls directed to operate stations 28 by switch 10 include calls directly to the operator, and other calls which are automatically forwarded to the operator by the switch. For example, one common function provided by a PBX is automatic forwarding of calls to an operator when the called phone is busy or upon a specific command to forward calls. When this is done, digital data representative of the original number being called and the number to which it is being transferred is sent to computer 20 over data line 22. For calls originating from within the facility served by switch 10, information on the calling party is usually also available. Data link 22 is typically an RS-232 communications channel, although other protocols could be used with the invention.

The operation of the operator stations 28 is similar to known computer controlled office message taking systems, such as the above-mention Wang Office. When a call is sent to an operator station by switch 10, data is sent to computer 20. If the call is being forwarded, computer 20 uses the information from switch 10 to identify the called party by consulting a stored directory, and then sends data representative of the called party to the operator station handling the call. This information is displayed to the operator by the operator station PC as the operator answers the telephone.

In addition to the identity of the called party, this information typically includes a customized answer (e.g., "Hello, John Smith's office."), the reason the call is being forwarded (which is determined from data sent to computer 20 from switch 10), the called party's title, and similar information. This allows the operator to more helpfully and rapidly respond to the caller's inquiries. It also eliminates the need for the operator to enter the called party's name and other information sent by the computer 20, thus reducing the time required by the operator to take the message. Frequently, several common messages, such as "returned your call," etc., may be quickly selected by the operator from a menu. If a message is taken, the message and associated information is sent from the operator station PC 28 to the central computer 20 for storage as text-coded data on the hard disk 38. The message may later be retrieved as described below.

In the described embodiment, the retrieval stations 36 are dedicated to message retrieval functions only. (It should be appreciated from the following description that the retrieval of messages may also be one of the functions implemented at a workstation.) Retrieval stations 36 are connected to the central computer by data lines 26. When the retrieval stations are not being used to retrieve a message, the retrieval station PC shows on its display a list of all persons who have messages for them. In a large company, the retrieval station will typically limit the display to persons within the department who have messages.

A person can retrieve messages in two ways. The first way is to be physically present at a retrieval station and manually request messages using the keyboard and display. Messages can optionally be printed by printer 34. This message retrieval mode is similar to that of known message retrieval systems, and is described in more detail below.

Messages may also be retrieved from remote locations by using a telephone. The procedures carried out by the system in this mode are described in detail below in conjunction with FIGS. 3–7.

To retrieve a message by phone, a person may call in to a message retrieval station by dialing the number of the telephone associated with the station. The call is detected and answered by telephone interface 30 under control of the PC. When the PC answers the phone, it sends a speech prompt over the phone lines via speech generator circuit 40 which allows the caller to retrieve and review messages in response to commands entered via the telephone push buttons.

Referring to the flow diagram of FIG. 3, the operation of the retrieval stations will be described. When the PC 24 in a retrieval station is first turned on, it carries out initialization procedures which load the computer memory with the necessary program information, block 100. After this has been done, the PC sends a request to computer 20 over data line 26 requesting data representative of all persons associated with that retrieval station who have pending messages, block 102. Depending on the size of the organization using the invention, this may include all persons in the system or only those persons in a particular department. When the PC receives the requested data, it displays on its screen 23 the names (or other identifying data, such as an ID label) of people having messages, block 104.

If the retrieval station is to operate to allow remote retrieval of messages by telephone, the PC next checks to see if a ring signal is present on the associated station line 14, block 108. This is done by having the PC read the data on line 55 from ring sense relay 54. If a ring signal is present, the PC answers the line by putting a signal on line 51, block 110. The PC then proceeds to carry out the steps shown in FIG. 4, block 112. If the PC does not detect a ring signal in block 108, it proceeds to block 118, described below.

A retrieval station may also be configured to allow retrieval of messages at the station itself. This selection is done by a system operator, and the type of retrieval performed is determined during the initialization, block 100. If a terminal is used to retrieve messages, the PC will proceed to block 114 instead of 108, as shown by dashed line 113. The PC next checks the keyboard to see whether the proper key has been depressed to select the mode where messages are retrieved at the terminal, block 114. If so, the PC proceeds to carry out the steps shown in block 116. Otherwise, the PC proceeds to block 118 where it communicates with computer 20 to update its list of message recipients, block 118, and then repeats the above sequence of events. In the preferred embodiment, the updating of message recipients is performed only periodically, typically every two minutes, to prevent the central computer 20 from being burdened with too many inquiries. It should be appreciated that while FIG. 3 shows the ring sense circuit or keyboard being polled via loop 106, these signals could equally well be detected via an interrupt driven structure.

Figure 4:
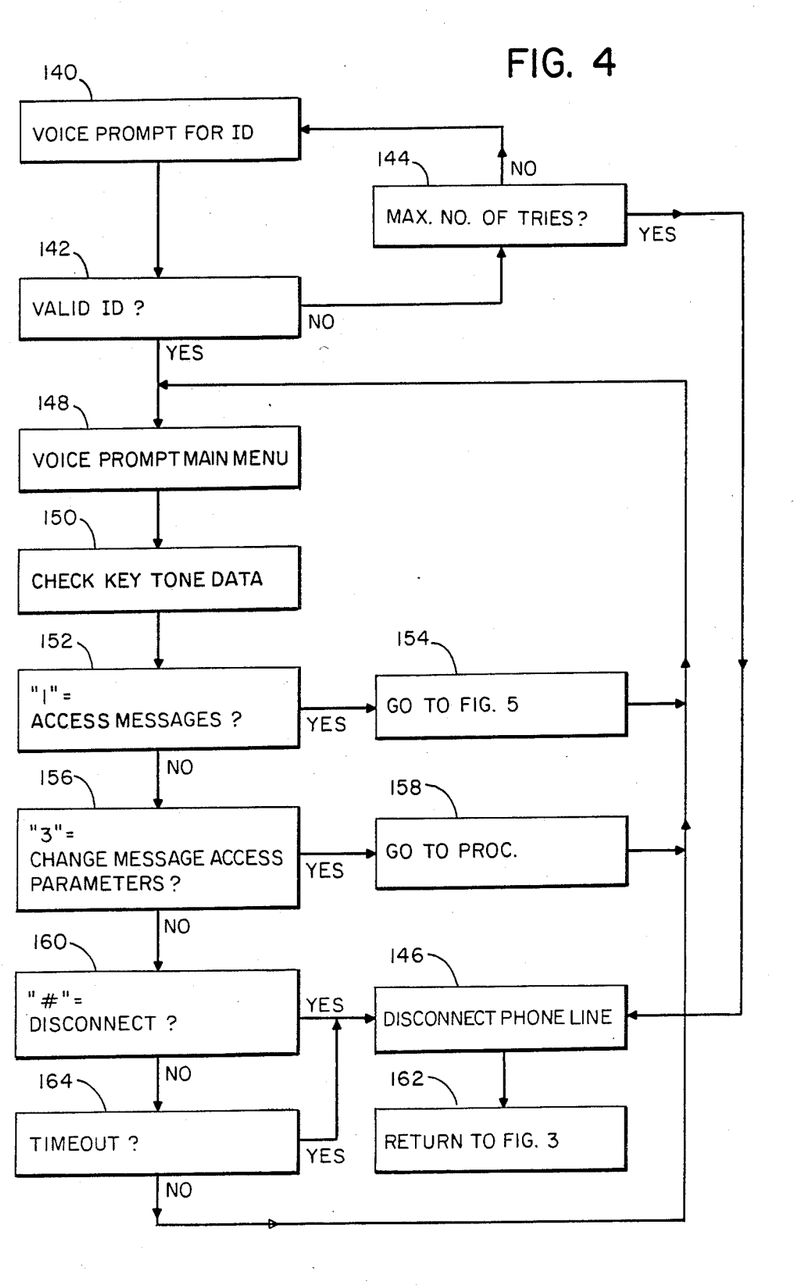
FIG. 4 is a flow diagram showing the steps carried out by a retrieval station processor to initiate retrieval of messages over a telephone line.

FIG. 4 shows the steps carried out when messages are retrieved over a telephone. After the phone line is answered, block 110, PC 24 sends a voice prompt over the line briefly identifying itself and prompting the caller to enter identifying data, block 140. This is done by applying the proper signals to speech generator circuit 60, as described above, to generate the desired signals on station line 14. The caller will then enter a password or ID number. The ID number is entered by using the push buttons of a conventional push button phone, or optionally via a small tone generator if a non-push-button phone is used.

The DTMF tones are decoded by circuitry in the interface 30, and data representative thereof is read by the PC. The PC then checks the ID number to vertify that the number identifies a caller who is permitted to retrieve messages, block 142. In the described embodiment, the list of authorized users is maintained by computer 20, and the PC verifies an ID by querying computer 20. Alternatively, this data could be downloaded from computer 20 when the retrieval station PC is first started or periodically. If the ID number does not match up with a permitted caller, the PC will send a speech prompt which so indicates, and the caller is given a chance to re-enter the correct ID number, block 144. If a correct ID is not entered within a predetermined number of attempts, the PC will so inform the caller and then go to block 146 where the line is disconnected, terminating the call.

It should be appreciated that provision for invalid entries should be made for all user inputs, similarly to blocks 142 and 144, even though such checks are not shown for all such inputs described below, and that the provision of such error checking procedures is well known and within the ordinary skill of one in the art.

After a valid ID has been entered, the PC sends out a "main menu" voice prompt, so-called because this is the top level of choices available to a user retrieving messages by phone, block 148. The PC then checks to see whether the DTMF detector 52 indicates that the caller has depressed any keys, block 150. Typically, the "menus" presented to a caller will give the caller a series of alternating actions each chosen by pressing one of the digits on the telephone keypad. In the described embodiment, the digit "1" is used to indicate that the caller wishes to access his or her messages. If the caller presses a "1," this is detected by the PC, block 152, and the PC carries out the steps shown in FIG. 5, block 154. Upon returning from the procedures of FIG. 5, the PC returns to the main menu, block 148.

A caller may also select options other than message retrieval. These options may differ, depending on the particular application. In FIG. 4, a caller may elect to change certain characteristics which the system keeps for each user, such as the speaking rate at which messages are played back, which printer is used to print copies of messages, etc. To do this, the caller presses "3," which is detected by the PC, block 156, which branches to carry out these procedures, block 158. After completing the steps in block 158, the PC returns to the main menu level, block 148.

In the described embodiment the "#" or pound key is used consistently to escape to the next higher level from the various levels of choices below the main menu. At the main menu level the pound key is used to logoff. When a pound key is detected by the PC at the main menu level, block 160, the phone line is disconnected, block 146, and the PC returns to the steps of FIG. 3, block 162. If no key is detected within a predetermined amount of time, block 164, the PC disconnects the phone line, block 146, and returns to FIG. 3. Again, it should be appreciated that the procedures shown in the figures may use polling of inputs, may be interrupt driven, or may be a combination.

Figure 5A:
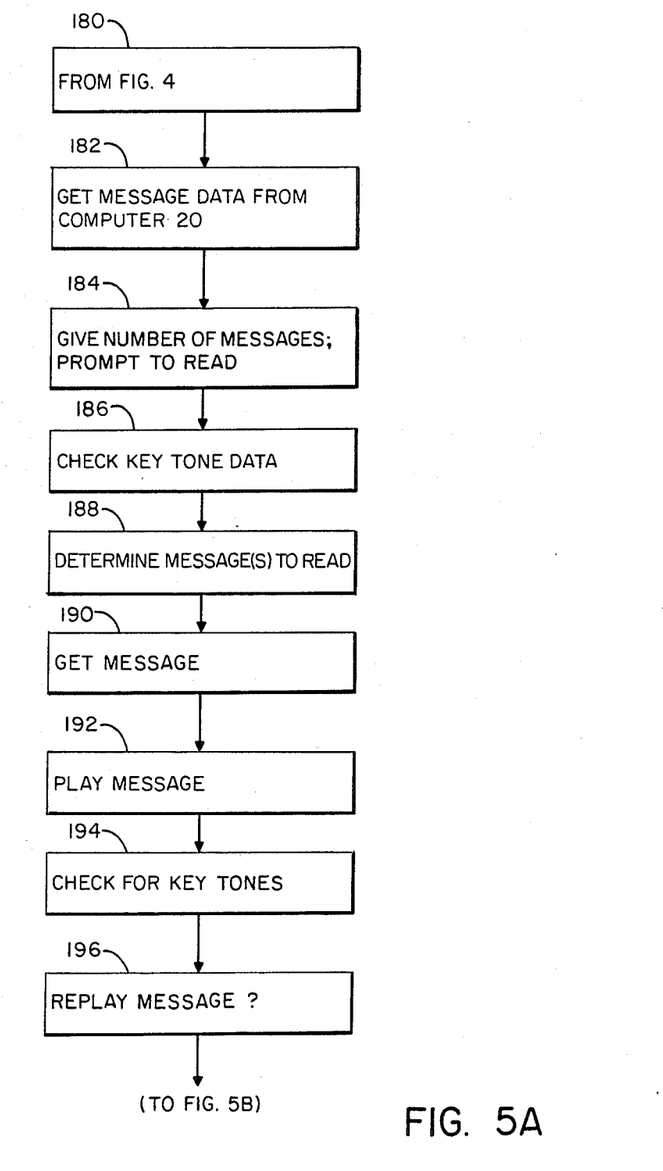
FIGS. 5A, 5B are two parts of a flow diagram showing the steps carried out by a retrieval station processor as it accesses individual messages.
Figure 5B:
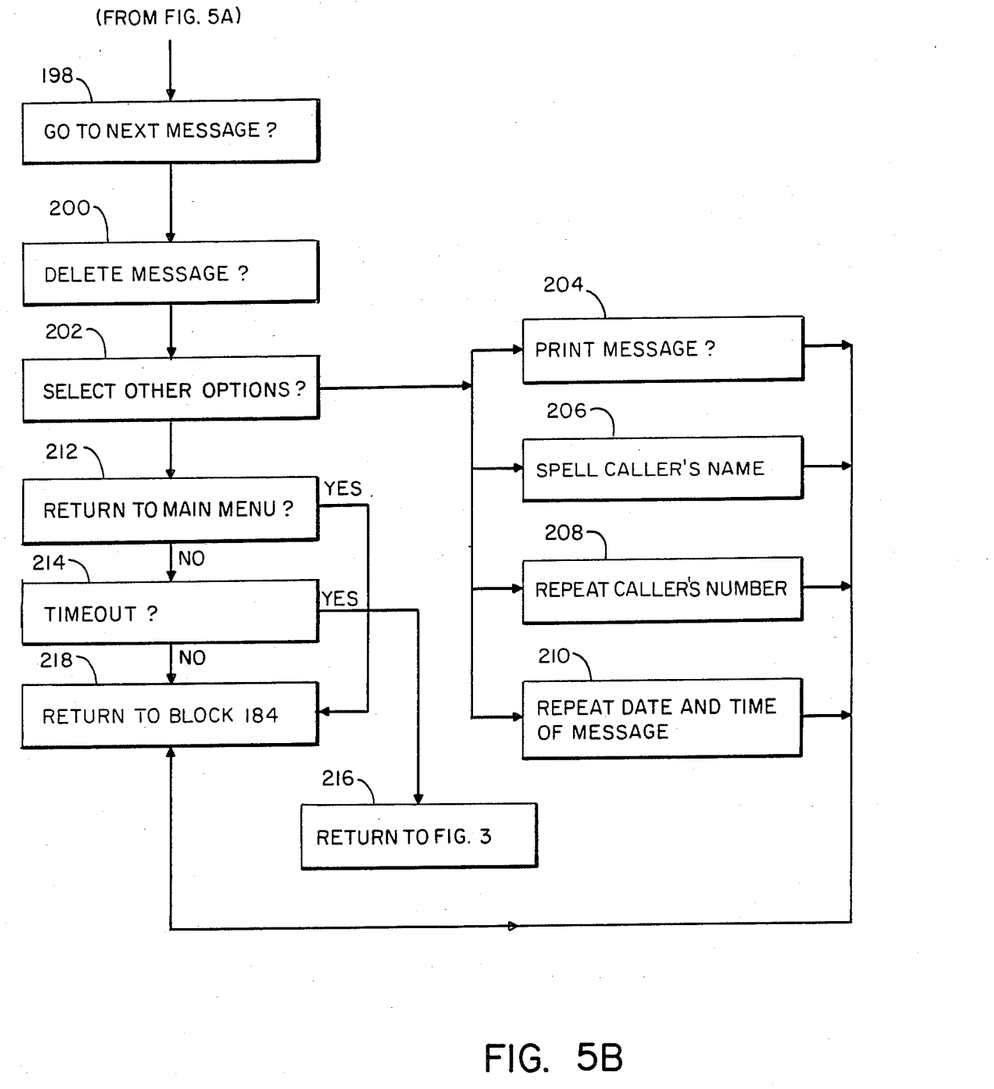

FIGS. 5A and 5B show the procedure by which messages are selected and reviewed. If a caller chooses to access messages from the main menu, block 152, the PC gets data identifying these messages from central computer 20, block 182. The PC next gives a voice prompt to the caller indicating the total number of messages and requesting that the caller identify which message to play back to the caller, block 184. The caller may identify a message by keying the corresponding number in on the telephone key pad or may have all messages played by keying in zero. The PC checks the key tone data from DTMF detector circuit 52, block 186, and determines which message or messages are to be read, block 188.

In the described embodiment, the data from computer 20 representative of each message is in the form of a record identifier. To get the requested message, the PC requests that computer 20 retrieve the corresponding record, block 190. The message is stored as and retrieved in the form of ASCII-encoded text data. When the text is sent by computer 20 over data line 26 to the PC, the PC plays the message to the caller by means of the previously described speech-processing software and speech generator circuit 60.

While the message or messages are being played, the PC checks to see whether any telephone keys have been depressed, block 194. It is desirable that the PC respond at any point in the menu structure to a key which is a legal option regardless of whether the prompt has been completely played, even though the flow diagrams show the keys being checked only at certain points in the procedures. This allows a user who is familiar with the system to quickly press the key sequence which will select the desired response from the system wihtout having to wait for all the prompts to be played.

Options available while or after a message is being played include replaying the message, block 196, playing the next message, block 198, deleting the message, block 200, or going to a next level of options, block 202. These options include printing a hard copy of the message, block 204. Part of a user's profile stored in the system includes the identification of a printer at which messages selected by the user may be printed for later collection. This printer may be changed. See the discussion above in connection with block 158. The caller may request that the PC spell the caller's name, block 206. This is especially important, since there will be some names which will be mispronounced by the text-to-speech conversion routines in the PC and circuit 60. The user may request that the number of the caller who left the message be repeated, block 208, or the time and date of the message, block 210.

The user may return to the main menu by pressing the pound key, as described above, block 212. If no keys are pressed for a predetermined time, the PC will prompt the user to enter a key, and if no key is entered, the phone is disconnected and the PC returns to the procedures of FIG. 3.

Figure 3:
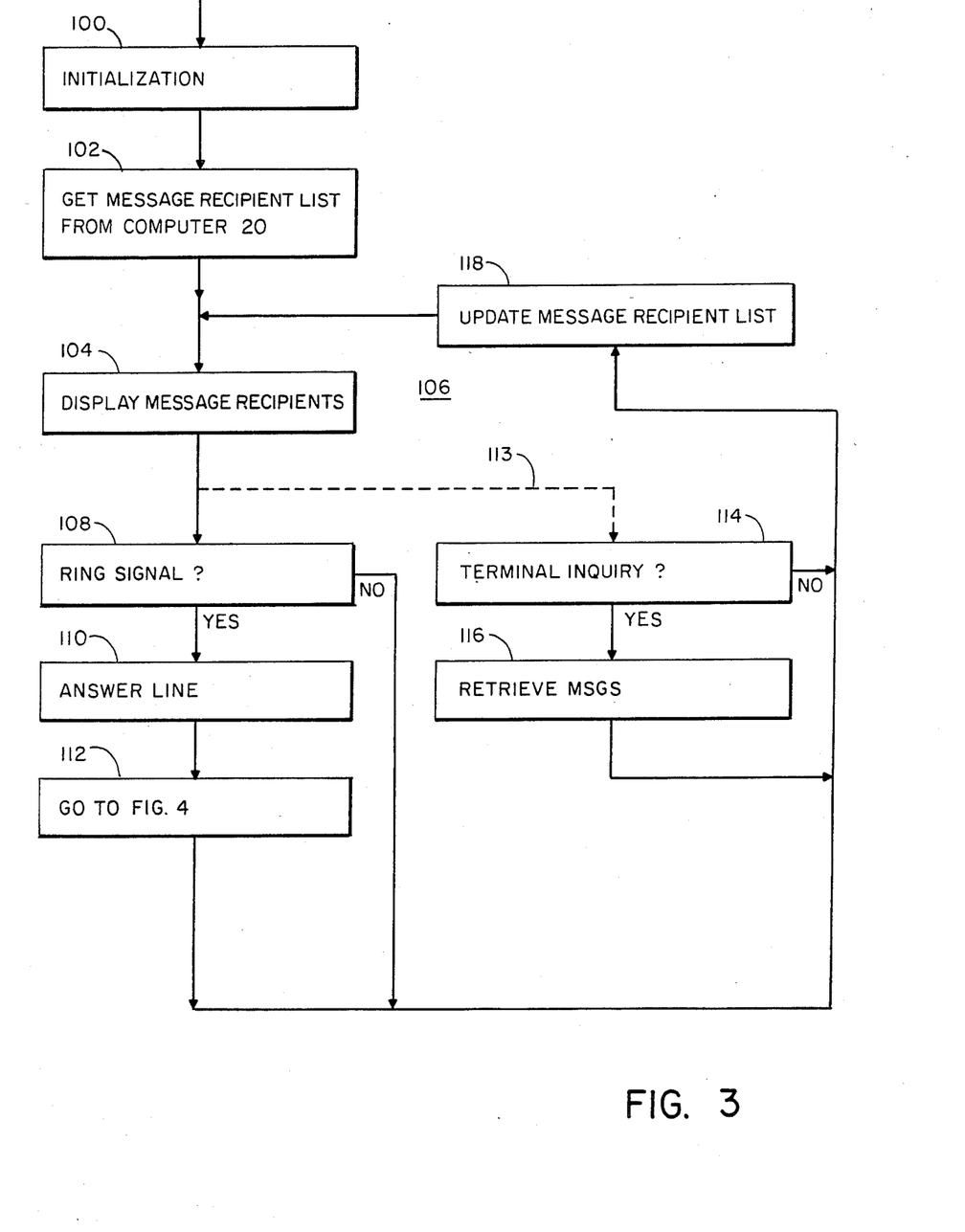
FIG. 3 is a flow diagram showing the steps carried out by a retrieval station processor when it is not retrieving messages.

As shown in FIG. 3, messages may be retrieved at a message retrieval desk, as shown in blocks 114–116. In this mode, the procedures carried out by the PC are very similar to those described above in conjunction with FIGS. 4 and 5, except that the prompts are displayed on the PC display 25 and choices are input via the keyboard 27, and with the exception of telephone specific prompts, such as "spell caller's name," which are unnecessary when using a terminal.

Figure 6:
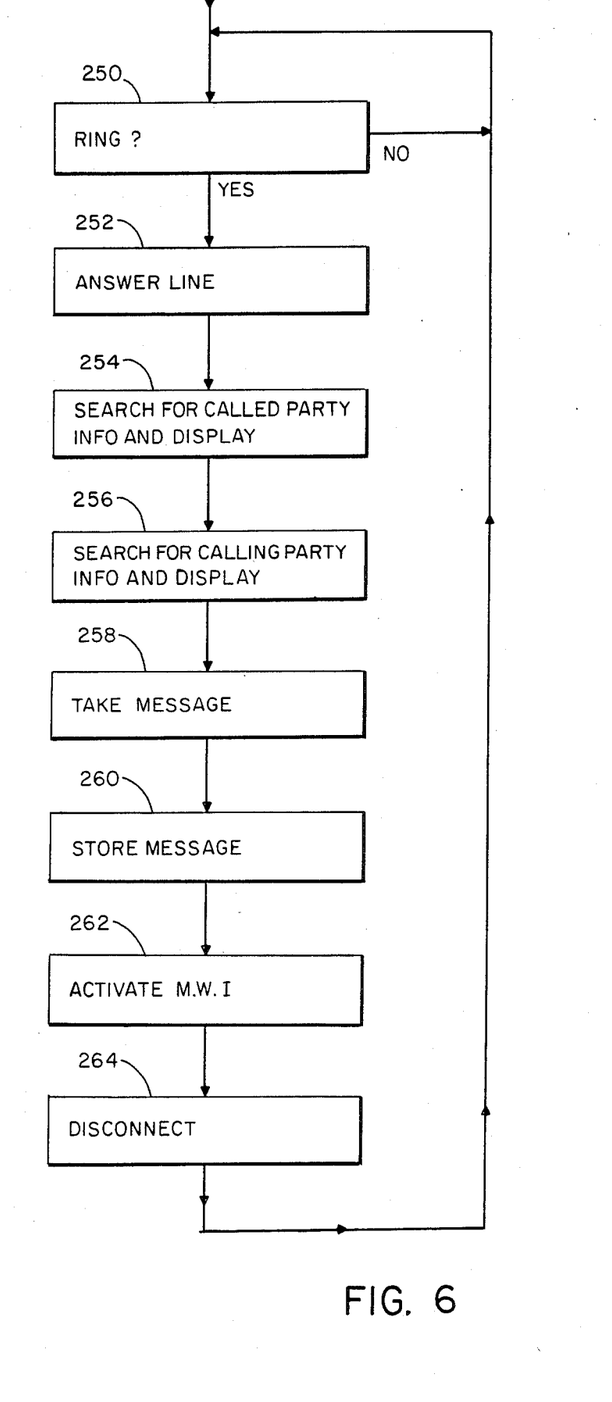
FIGS. 6 and 7 are flow diagrams showing the steps carried out by an operator station.
Figure 7:
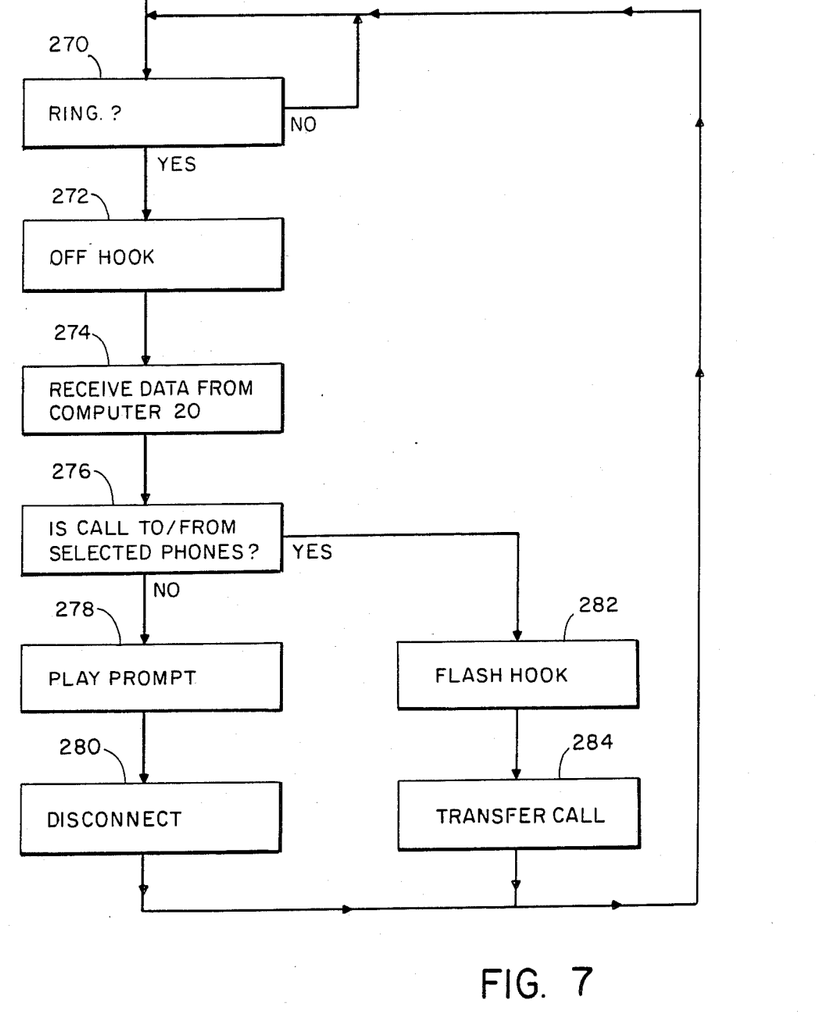

FIGS. 6 and 7 show the routines carried out by the PC's at operator stations 28. As discussed above, many of the functions are similar to known procedures used in conventional office message and communications systems, and the procedures set forth below may be adapted or expanded by one or ordinary skill in the art to incorporate additional functions without departing from the scope and teachings of the present invention.

FIG. 6 shows briefly the procedures carried out by an operation station PC when the operator station is being attended. The process begins when a call is directed to an operator station by telephone switch 10. The operator station PC detects the ring signal, block 250, and provides an indication of an incoming call on the PC display. The operator may manually answer the call, or the PC may optionally automatically answer the call, block 252. When a call is answered, the PC fetches from central computer 20 information about the calling party, block 254. The particular information supplied will depend upon the application, but typically includes the called party's name, title, phone number, the name(s) and number(s) of a secretary and/or assistant who may be able to help a caller, and other similar information.

This information is retrieved by computer 20 from a database of user information which it keeps, based on the called party data which telephone switch 10 provides to computer 20. This information may also contain an indication of why the call was forwarded, such as line busy, not answered, etc. This information is immediately displayed to the operator for use in answering the call. If the call is from a phone served by switch 10, the operator station may also receive information about the calling party from computer 20, based on calling party information supplied by switch 10, block 256.

As part of responding to the call, the operator may take a message, block 258. Typically, several common messages, such as "returned your call," "please call back," "urgent," etc., may be selected by one key by an operator. Alternatively, the operator may type in a message. In either case, the message is sent to central computer 20 where it is stored as text data, such as ASCII-encoded data, block 260. (The use of ASCII encoded data in the embodiment described herein should not be taken as limiting the invention to systems using ASCII encoding. Other systems for encoding text data exist, and the present invention is equally applicable to such systems.) Central computer 20 may optionally activate a message waiting indication, such as a light on the telephone or an altered dial tone, at the telephone of the called party to inform the party that a message is waiting, block 262. The PC then disconnects from the line, block 264, if the phone is being automatically answered, and repeats the above procedure.

The operator station may also have an unattended mode, shown in FIG. 7. In this mode, the PC checks for a ring signal, block 270, and answers the line when a ring is detected, block 272. The PC then gets called and calling party information, block 274. Based on this information, the PC may select optional responses, as illustrated in FIG. 7, block 276. Typically, the operator station will either play a prompt indicating that calls are not being answered, block 278, and disconnect the caller, block 280, or transfer the call to another number. To transfer the call, the PC sends signals on line 51 to flash hook (i.e., momentarily disconnect) the station line 14, block 282, and then sends signals to the DTMF generator 58 representative of the number to which the call is to be transferred, block 284. This will cause the PBX switch 10 to transfer the call to the selected extension. The PC then returns to block 270.

There has been described a new and useful invention in message taking and retrieval systems. It should be appreciated that modifications and extensions to the present invention will be made by those of ordinary skill in applying the teachings set forth herein in various different situations. Accordingly, the description herein of particular embodiments of the invention should not be taken as a limitation on scope of the invention, but rather the invention should be interpreted only in accordance with the following claims.

What is claimed is:

1. Apparatus, responsive to signals applied to phone lines by a user for allowing the user to selectively retrieve message data stored in a computer system, comprising:

storage means, associated with said computer system, for storing a plurality of text-encoded messages for a plurality of users, including possibly more than one text-encoded message for each said user;

decoding means, responsive to signals sent over the phone lines by a user, for decoding the signals and providing decoded data representative thereof;

speech means, responsive to text-encoded data applied thereto, for applying signals to the phone lines representative of the spoken equivalent of text information represented by the text-encoded data; and retrieval means connected to said phone lines for responding to decoded data from said decoding means representative of first signals sent by said user on said phone lines selectively identifying any given one or more of said messages for said user from said plurality of stored text-encoded messages, for retrieving said one or more of the selectively identified text-encoded messages from the storage means, and for applying the retrieved text-encoded message or messages to the speech means, whereby the user may listen to said given one or more of said messages without having to listen to other ones of said messages for the user.

2. The apparatus of claim 1 wherein the means for decoding includes means for decoding DTMF signals on said phone lines and for producing digital data representative thereof.

3. The apparatus of claim 1 wherein the storage means includes means for storing data associated with each text-encoded message, including text-encoded caller data representative of the source of the associated text-encoded message, and wherein the retrieval means is responsive to second signals on said phone lines for applying text-encoded data representative of the sound of each letter of said text-encoded caller data to the speech means.

4. The apparatus of claim 1 wherein the means for retrieval further is responsive to third signals on said phone lines for deleting selected ones of said text-encoded messages stored by said storage means.

5. The apparatus of claim 1 wherein the storage means is further operative for storing user data about a plurality of users, and wherein said retrieval means is further responsive to user data stored in said storage means and to decoded data from the decoding means resulting from second signals on said phone lines representative of a user code identifying one of said users, for providing a confirmation signal indicating that said user code corresponds to one from among said plurality of users, and for preventing retrieval of messages until said confirmation signal is provided.

6. The apparatus of claim 5 wherein said storage means associates each of the text-encoded messages stored thereby with a selected one from among said plurality of users, and wherein said retrieval means is further responsive to said second signals, for determining which from among said plurality of stored text-encoded messages are associated with the user identified by said user code, and for allowing only messages associated with the identified user to be retrieved in response to signals on the phone lines.

7. The apparatus of claim 5 wherein said storage means associates each of the text-encoded messages stored thereby with a selected one from among said plurality of users, and wherein said retrieval means is further arranged for determining the number of stored text-encoded messages associated with the user identified by said user code, for generating text-encoded message-number data representative of said number, and for applying said generated text-encoded message-number data to said speech means.

8. The apparatus of claim 1 wherein text-encoded messages stored by said storage means include text-encoded prompt data representative of a prompt requesting entry by a user of selected information; and further including means for applying said data representative of said prompt data to the speech means.

9. A system for taking and retrieving telephone messages and adapted to be used by an operator receiving calls forwarded to an operator station by a telephone exchange, comprising:

storage means for providing storage for information concerning a plurality of users;

means for receiving calls directed to a user and forwarded to the operator station by the telephone exchange, including means responsive to called-party information from the exchange for retrieving and displaying to the operator information in said storage means concerning the called user;

means, responsive to the operator, for storing messages as text-encoded data in said storage means; and means, connected to said storage means and to a telephone line, for answering the telephone line, for responding to user identification data stored in said storage means and to DTMF signals on the telephone lines for verifying that the DTMF signals represent a valid user, for providing a verification signal representative that a valid user has been identified, for operating in response to the verification signal to determine whether any messages are stored in the storage means for the identified user, and for responding to further DTMF signals on the telephone line by selectively playing back messages for the identified user, including means for converting text-encoded data into electrical signals representative of the sound of the text when spoken.

10. A method for enabling a user to retrieve one of a plurality of text-encoded telephone messages stored in a computer with the aid of an operator, comprising enabling the operator to receive spoken messages via telephone lines and store said spoken messages as said text-encoded messages, accepting signals sent over a telephone line by a user identifying said one text-encoded message, decoding the accepted signals to provide corresponding decoded data, retrieving the identified stored text-encoded message on the basis of said decoded data, converting the retrieved text-encoded message to speech signals corresponding to the spoken equivalent of text information requested by said text-encoded data, and applying the speech signals to the telephone line to enable the user to listen to the identified message.

11. A method for taking and retrieving telephone messages via a telephone exchange, with the aid of an operator to whom calls and associated called-party information are forwarded by the telephone exchange, comprising storing information concerning users, retrieving and displaying to the operator on the basis of the called-party information from the telephone exchange, the stored information concerning one of said users being called, enabling the operator to store messages for the user being called as text-encoded data, answering a telephone line coupled to the telephone exchange to accept a call of one of said users seeking to retrieve previously stored messages, responding to DTMF identification signals sent by said calling user on said telephone line and to previously stored user identification data by verifying that the DTMF signals represent a valid user, and providing a verification signal when a valid user has been identified, responding to said verification signal by determining whether there are any messages stored for the identified user, and in response to further DTMF signals on the telephone line, selectively playing back messages for the identified user by converting the text-encoded data into electrical signals representative of the sound of the text when spoken.

12. Apparatus, responsive to signals applied to phone lines by a user for allowing the user to selectively retrieve message data stored in a computer system, comprising:

storage means, associated with said computer system, for storing a plurality of text-encoded messages for a plurality of users, including possibly more than one text-encoded message for each said user;

decoding means, responsive to signals sent over the phone lines by a user, for decoding the signals and providing decoded data representative thereof;

speech means, responsive to text-encoded data applied thereto, for applying signals to the phone lines representative of the spoken equivalent of text information represented by the text-encoded data;

retrieval means, connected to said phone lines, for responding to decoded data from said decoding means representative of first signals sent by said user on said phone lines identifying one or more of said messages for said user from said plurality of stored text-encoded messages, for retrieving said one or more of the identified text-encoded messages from the storage means, and for applying the retrieved text-encoded message or messages to the speech means, whereby the user may listen to said identified one or more messages;

said storage means further storing user data about a plurality of users, said retrieval means responding to user data stored in said storage means and to decoded data from the decoding means resulting from second signals on said phone lines representative of a user code identifying one of said plurality of users, for providing a confirmation signal indicating that said user code corresponds to one from among said plurality of users, and for preventing a retrieval of messages until said confirmation signal is provided;

said storage means associating each one of the text-encoded messages stored thereby with a selected one from among said plurality of users, said retrieval means being responsive to said second signals for determining which from among said plurality of stored text-encoded messages are associated with the user identified by said user code, and for allowing only messages associated with the identified user to be retrieved in response to signals on the phone lines;

said apparatus being further adapted to store and retrieve messages resulting from calls which are directed to a called-party who is one of said plurality of users and which are forwarded by a telephone exchange switch to an operator station;

means, connected to said exchange switch and responsive to data therefrom representative of the called party and to the data stored by said storage means, for automatically displaying at the operator station data pertaining to said called party; and means for allowing an operator to input as text-encoded data a message and for storing said message in said storage means and associating said message with the called party.

13. The apparatus of claim 1 wherein said first signals comprise DTMF signals representative of telephone keypad entries made by the user, each one of said DTMF signals corresponding to a predetermined one of said text encoded messages for the user, said retrieval means responding to each said DTMF signal by retrieving the text-encoded messsage corresponding thereto and applying said retrieved text-encoded message to said speech means, whereby the user may select and listen to messages corresponding to said keypad entries.

14. The apparatus of claim 1 wherein said first signals comprise a DTMF signal representative of a predetermined telephone keypad entry made by the user, said retrieval means responding to said DTMF signal by retrieving all said text-encoded messages for said user and applying said retrieved text-encoded messages to said speech means, whereby the user may listen to all of the user's messages by making said predetermined telephone keypad entry.

15. The apparatus of claim 1 wherein said retrieval means is further responsive to additional signals sent on said phone lines by the user for applying said retrieved text-encoded message or messages to a printer selected by said additional signals.

* * * * *